United States Patent [19] [11] 3,903,465
Ibamoto et al. [45] Sept. 2, 1975

[54] CHOPPER CONTROL SYSTEM

[75] Inventors: Masahiko Ibamoto; Sigeru Kuriyama, both of Katsuta, Japan

[73] Assignee: Hitachi, Ltd., Japan

[22] Filed: Nov. 27, 1973

[21] Appl. No.: 419,352

[30] Foreign Application Priority Data
Dec. 4, 1972 Japan............................ 47-121824

[52] U.S. Cl................................. 318/341; 318/139
[51] Int. Cl.².......................................... H02P 5/16
[58] Field of Search............ 318/139, 246, 249, 341, 318/599

[56] References Cited
UNITED STATES PATENTS
| | | | |
|---|---|---|---|
| 3,349,309 | 10/1967 | Dannettell | 318/341 |
| 3,500,161 | 3/1970 | Domann et al. | 318/341 X |
| 3,551,774 | 12/1970 | Rusch | 318/341 |
| 3,716,767 | 2/1973 | Kuriyama et al. | 318/139 |

*Primary Examiner*—Robert K. Schaefer
*Assistant Examiner*—W. E. Duncanson
*Attorney, Agent, or Firm*—Craig & Antonelli

[57] ABSTRACT

An improved chopper control system is proposed. In the system, a d.c. current supply to a d.c. motor is controlled through a chopper which is provided with a main thyristor and an auxiliary thyristor for turning off the main thyristor. The chopper allows a main circuit current to flow during a short period when the auxiliary thyristor is rendered conductive. A rectangular wave oscillator and a differential circuit are provided to apply a chopper-off signal to the auxiliary thyristor at regular intervals and a phase shifter is provided to apply a chopper-on signal with a controlled phase to the main thyristor coacting with the rectangular wave oscillator. The application of the chopper-off signal to the chopper is prohibited by a prohibit circuit when an output signal is produced by a constant voltage element for detecting a high voltage across the chopper. By the thus arranged control system, a fine control of the duty cycle of the chopper can be performed.

7 Claims, 3 Drawing Figures (a)

(b)

(c)

(d)

(e)    $I_o$

CHOPPER CONTROL SYSTEM

The present invention relates to a control system for a thyristor chopper, and particularly to an improved chopper control system capable of finely controlling the duty cycle of the chopper.

A d.c. motor control system using a thyristor chopper has been employed in the field of industrial electrically powered vehicles, such as railway vehicles, electromobiles, or battery locomotives. The thyristor chopper acts as a static switch to close and open the supply circuit of a current from a d.c. source to a load such as a d.c. motor, so that the average voltage (or current) applied to the load may be continuously controlled.

When a thyristor (a silicon controlled rectifier) is used in a thyristor chopper, it is usually necessary to impress an inverse bias voltage across the anode and cathode terminals of the thyristor for a short period of about several tens microseconds to turn it off from the conduction state. A conventional thyristor chopper is constructed in such a manner that stored charges in a capacitance is used to apply a chopper-off signal to the gate of a commutating auxiliary thyristor to turn it on to thereby applying an inverse bias to the main thyristor of the chopper. A time of several hundreds of microseconds is usually required until the chopper is turned off after the chopper-off signal has been impressed thereon. This time is called the commutation interval. The commutation interval is determined by the characteristics of the thyristor employed, and the circuit constants of the chopper circuit, the power source circuit and the load circuit, resulting in it being impossible to externally control the commutation interval.

In a chopper control system, a control signal is applied to a chopper-on signal generator and the phase thereof is controlled therein while a chopper-off signal is periodically applied to the chopper regardless of the control signal. The periodically applied chopper-off signal enables the main current to flow through the main circuit of the chopper control system during a short period (the commutation interval). Thus, even if the chopper-on signal is eliminated, there is a limit in the minimum duty cycle of the chopper. Accordingly, it is impossible to control the on-time of the chopper to less than the commutation interval. By the way, the duty cycle of the chopper is defined as the ratio of on time in any one cycle of chopping action of the chopper to one period of the cycle, so that the duty cycle of the chopper may be decreased by reducing the chopping frequency. For this reason, in a conventional chopper control system the control frequency of the chopper is adjusted when control is required on the range of the small duty cycle thereof.

However, such a conventional chopper control system had disadvantages in that such requirement of the variation of the control frequency results in complexity of the circuit, requiring lots of circuit elements, and the complexity of the circuit makes the system high cost and lessens the reliability of the system in turn.

Further, a preferable wide range of the frequency variation is restricted by the limit in the performance of the oscillator and the need of taking account of the reference characteristics on the various sections of the system, resulting in further disadvantage of the system.

Accordingly, an object of the present invention is to provide a chopper control system in which the minimum duty cycle is reduced without making the control circuit thereof complicated. Namely, control can be performed at a duty cycle below the minimum duty cycle peculiar to a chopper, as discussed above, even if the chopper is of a simple and constant frequency type.

As described above, the chopper-off signal usually is periodically applied to the chopper. Thus, the periodic chopper-off signal also enables the chopper to pass the main current in the main circuit of the chopper control system during the commutation period, resulting in establishing a lower limit in the minimum duty cycle of the chopper even if the chopper-on signal is eliminated.

The elimination of such lower limit in the minimum duty cycle of the chopper may be produced by carrying out such an idea that the chopper-off signal is impressed on the commutation thyristor only when the chopper is on the on-condition. That is to say, in the thus constructed chopper control system, the chopper-off signal is constrained by the chopper-on signal and therefore constrained by the control signal so that the control is possible at a duty cycle less than that inherent to the chopper.

According to this invention, there is provided a chopper control system for controlling a chopper which allows a temporary main current to flow when a commutation thyristor is turned on and is controlled by a periodical chopper-off signal and a chopper-on signal which is synchronized with the chopper-off signal and is phase shifted, characterized in that the chopper-off signal is prohibited when the chopper is in the off-condition.

The object stated above and the other objects and advantages of the invention will become apparent from the following detailed description of the preferred embodiments taken in connection with the accompanying drawings, in which.

A detailed explanation will be made hereinafter of an embodiment of the present invention.

Figure 1:
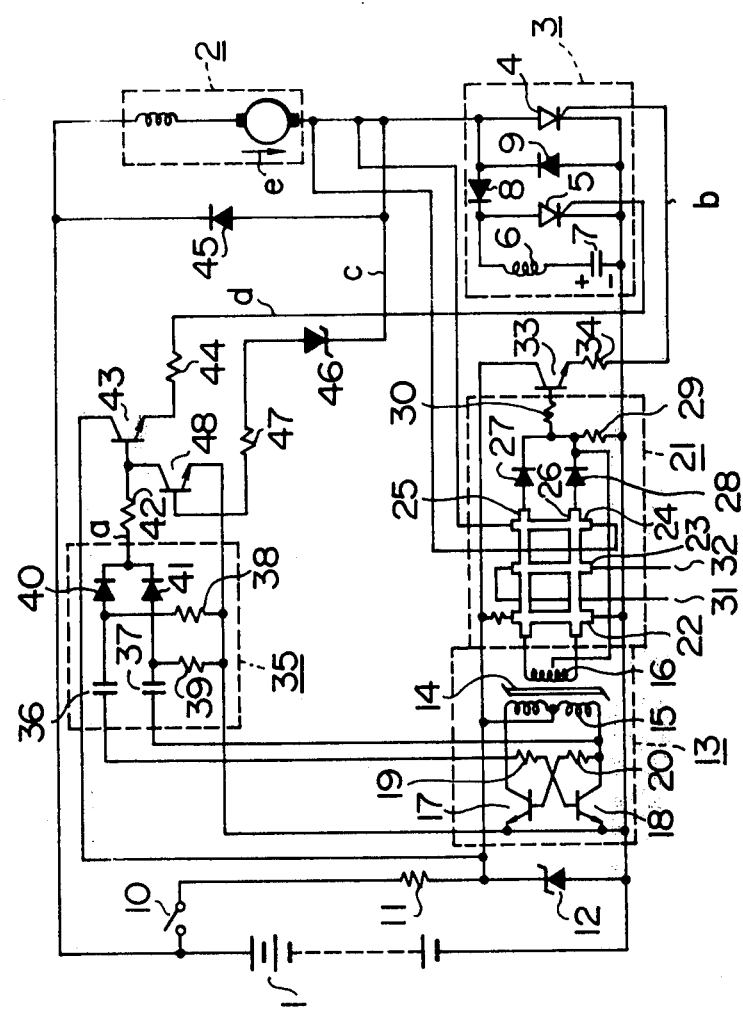
FIG. 1 is a schematic circuit diagram of an embodiment of a chopper control system according to the present invention applied to motor control.

Referring to FIG. 1, a battery 1, a d.c. series wound motor 2 and a chopper 3 are connected in series. The chopper 3 is comprised of a main thyristor 4, an auxiliary thyristor 5 for commutation, a commutation reactor 6, a commutation capacitor 7, a commutation diode 8 and a by-pass diode 9. The by-pass diode 9 may be eliminated.

As is known well, the commutation operation of a repulsion pulse type chopper is performed in the manner so that the conduction of the auxiliary thyristor forms an oscillatory circuit consisting of the auxiliary thyristor 5, the commutation capacitor 7 and the commutation reactor 6. In the oscillatory circuit, the electric charge stored in the capacitor 7 with the polarity shown in FIG. 1 is discharged through the reactor 6 and the thyristor 5, and then the polarity of the electric charge stored in the capacitor reverses. The electric charge with the inverse polarity is again discharged through the by-pass diode 9, the commutation diode 8, and the commutation reactor 6 thereby causing the main thyristor 4 and the auxiliary thyristor 5 to turn off. After the completion of the latter discharging, the capacitor 7 is charged again, by the oscillatory current, with the original polarity as shown in FIG. 1.

When the by-pass diode 9 is not employed, the electric charge of the capacitor 7 with the polarity inverse to that of shown in FIG. 1 serves to turn off the thyristors 4 and 5. On the other hand, the commutation capacitor 7, in this case, is recharged through the main circuit comprising the battery 1, the series motor 2, the commutation diode 8, the commutation reactor 6 and the capacitor 7, because the C-R oscillatory circuit is not formed. That is to say, the recharging current flows through the load 2 with the result that the chopper control system has a tendency to increase the minimum duty cycle of the chopper.

The commutation interval is several hundreds of microseconds, and the duty cycle of a chopper can not be reduced to the duty cycle less than determined by the commutation interval.

Further, when a chopper-off pulse is applied to the auxiliary thyristor 5 at the off time of the main thyristor 4, the both terminals of the chopper 3 are short-circuited by the commutation diode 8 during the commutation interval of several hundreds of microseconds as mentioned above. This condition is equivalent to the on-condition of the chopper 3.

The present invention is directed to an improvement of the chopper control system of such a type that it becomes on such equivalent on-condition temporarily when a chopper-off pulse is applied thereto. It will be noted that the present invention is applicable to any type of the chopper other than the repulsion pulse type chopper if they have the same nature of the operation as stated above.

Referring to FIG. 1 again, across the battery 1 is connected a series circuit consisting of a switch 10, a resistor 11 and a Zenor diode 12 which serves as a constant voltage source. A known magnet multivibrator 13 (Royer oscillator) is composed of a saturable core 14, a primary winding 15, a secondary winding 16, transistors 17 and 18, and resistors 19 and 20, and can produce a rectangular wave with a constant frequency. The frequency thereof is selected to an optimum value for controlling the chopper 3. A magnetic phase shifter 21 is supplied with the output voltage of the magnetic multivibrator 13, and consists of two saturable cores, diodes 27 and 28, and resistors 29 and 30. The two saturable cores are wound with a common bias winding 22 and a common control winding 23 and a common feedback winding 24, and further wound with output windings 25 and 26, respectively. The magnetic phase shifter 21 is of an magnetomotive force comparative type which operates in the manner so that when instruction currents are applied to terminals 31 and 32, they are compared with a feedback current which is fed back from the motor 2 to the feedback winding 24 so as to produce an output pulse having a phase according to the difference between the instruction current and the feedback current. The output pulse is applied to the base terminal of the transistor 33 via the resistor 30 and to the gate terminal of the main thyristor 4 of the chopper 3 through resistor 34 as a gate signal or a chopper-on signal. Thus, the magnetic phase shifter 21 serves as a chopper-on signal generator.

Differential capacitors 36 and 37, resistors 38 and 39, and diodes 40 and 41 compose a differential circuit 35, in which the output signals of the magnetic multivibrator 13 are differentiated through the capacitors 36 and 37, and the resistors 38 and 39 so as to produce a logic sum through the diodes 40 and 41. Thus, the circuit 35 can produce a pulse having a narrow pulse width at a desired pulse rate to control the chopper 3. This output pulse is applied to the base of an amplifier transistor 43 through a resistor 42 and then the output of the transistor 43 is applied to the auxiliary commutation thyristor 5 through a resistor 44 as a gate signal or a chopper-off signal. Thus, the differential circuit 35 forms a chopper-off signal generator.

In the thus arranged chopper control system, the duty cycle of the chopper can be controlled by applying desired instructions for the motor current to the terminals 31 and 32 so as to change the mean value of the motor current to coincide with the instructed motor current.

When the system of FIG. 1 is applied to a vehicle, for example an electro-mobile or a fork lift, as a driving motor thereof, a small instruction current applied to the terminals 31 and 32, which is, for example, produced by stepping on the accelerator enbles the motor 2 to rotate to allow the vehicle to start even if the current is very small. This is because the pulse signals periodically applying to the gate terminal of the thyristor 5 cause the chopper 3 to be in quasi-on-condition during several hundreds of microseconds at each pulse application thereby allowing the motor current to flow.

The operation of the quasi-on-condition of the chopper 3 will be explained with reference to the waveforms shown in FIG. 2.

Figure 2:
FIG. 2 and FIG. 3 show various waveforms at various portions of the system for explaining the action of the chopper control system of FIG. 1.
Figure 2:
Figure 2:
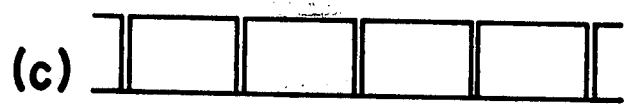
Figure 2:
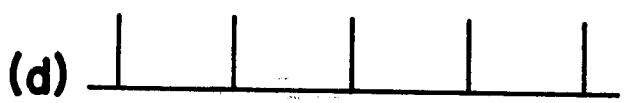
Figure 2:
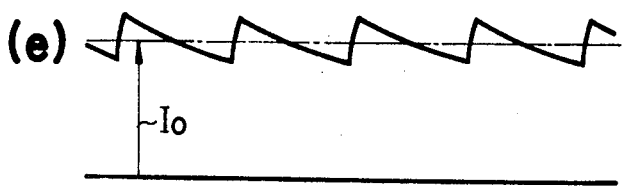

FIG. 2($a$) shows the chopper-off signal from the differential circuit 35 to the auxiliary thyristor 5. The chopper-off signal causes the chopper 3 to be in the quasi-on-condition so that, even if the chopper-on signal is not supplied to the chopper as shown in FIG. 2($b$), the terminal voltage of the chopper 3 is periodically reduced to zero during several hundreds of microseconds as shown in FIG. 2($c$). As a result, the motor current of the motor 2 becomes a continuous current including a pulsation due to the smoothing effect of a free-wheeling diode 45, as shown in FIG. 2($e$). The mean value of the motor current is designated by reference character $I_o$. Accordingly, if nothing is further employed for the above-mentioned chopper control system, it is impossible to finely control the motor at a point below the average current $I_o$ with the result that fine control of the vehicle running is impossible at a low speed.

For this reason, in the system according to the present invention, the chopper-off signal is prohibited when the chopper 3 is in the off-condition. The simple way to detect the off-condition of the chopper 3 is to measure the terminal voltage thereof. Accordingly, there is provided a circuit composed of a transistor 48, a resistor 47, and a Zenor diode 46. The anode terminal of the Zenor diode 46 is connected to the base terminal of the transistor 48 via the resistor 47 while the cathode terminal of the Zenor diode 46 is connected to the anode side of the chopper 3. The transistor 48 is arranged so as to be able to short-circuit the output terminal of the differential circuit or chopper-off signal generator 35. The Zenor diode 46 is used to ensure the circuit operation, and therefore it is not always necessary.

The operation of the thus constructed circuit will be described below in connection with FIG. 3.

Figure 3:
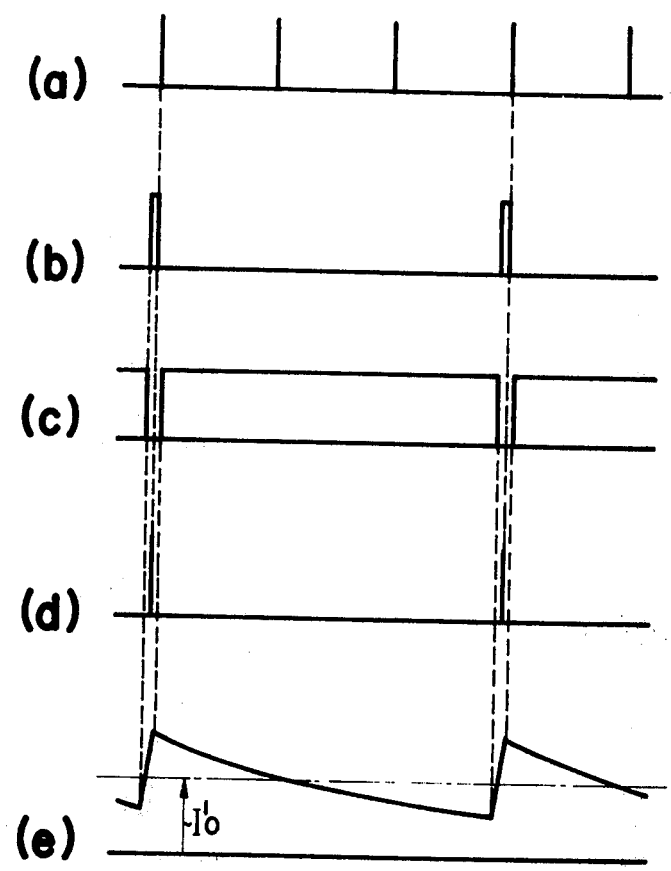

The output signal of the chopper-off signal generator 35, i.e. the voltage at the point $a$ found in FIG. 1 is periodically generated as shwon in FIG. 3($a$). When the chopper 3 is in the off-condition, it has a voltage as shown in FIG. 3($c$) across the chopper. The voltage across the chopper is applied to the base terminal of the transistor 48 through the Zenor diode 46 and the resistor 47, which in turn causes the transistor 48 to turn on, so that the chopper-off signal is by-passed to ground through the transistor 48 and the transfer thereof to the base terminal of the transistor 43 is prohibited. Accordingly, only when the gate signal is applied to the main thyristor 4 as shown in FIG. 3($b$) so as to reduce the voltage across the chopper 3 to zero or to be small enough to hold the Zenor diode 46 in the off-condition, the gate signal is allowed to reach the gate terminal of the auxiliary thyristor 5, as shown in FIG. 3($d$). Thus, the motor current has a long period of pulsation with small average current $I'_a$, as shown in FIG. 3($e$). As a result, the motor current can be controlled by continuously changing the instruction current even at a very low amplitude thereof. That is to say, it is possible to reduce the lower limit of the continuous control for the motor current to substantially zero.

From the foregoing description it is readily apparent that a smooth starting and a speed control at an extremely low speed can be attained in an industrial electrically powered vehicle, such as an electromobile or a battery fork lift, in which the chopper control system according to the present invention is incorporated into.

Although the description has been made so that the chopper-off signal is applied to the chopper at a constant frequency, it should be noted that the application of the chopper-off signal to the chopper may be made with a variable frequency, if necessary.

It will be apparent to those skilled in the art that the present invention is not limited to the specific details described above and shown in the drawings, and that various modifications are possible in carrying out the features of the invention without departing from the scope of the invention.

What we claim is:

1. A chopper control system, comprising:

a chopper for controlling a main current flowing through a load, said chopper including a main thyristor and an auxiliary thyristor for turning off said main thyristor, and enabling the main current to flow for a short period when said auxiliary thyristor is turned on;

a chopper-off signal generator for supplying periodically said auxiliary thyristor with a signal for turning on said auxiliary thyristor;

a chopper-on signal generator for supplying said main thyristor with a signal, for turning on said main thyristor, being synchronized with said chopper-off signal and having a controlled phase;

detecting means to detect the off-condition of said chopper;

prohibiting means adapted to prohibit said chopper-off signal from being applied to said chopper in response to the output signal of said detecting means.

2. A chopper control system according to claim 1, in which said chopper-off signal generator generates said turning-on signal at constant intervals.

3. A chopper control system according to claim 1, in which said detecting means includes means for detecting the voltage across said chopper.

4. A chopper control system according to claim 1, in which said chopper-off signal generator includes a rectangular wave oscillator and a differentiator for differentiating the output of said rectangular wave oscillator, and said chopper-on signal generator includes said rectangular wave generator and a phase shifter for controlling the phase of the output of said rectangular wave oscillator.

5. A chopper control system according to claim 1, in which said system further comprises a d.c. power source; and said chopper, said d.c. power source and said load form a closed circuit.

6. A chopper control system according to claim 5, in which said load includes a d.c. motor.

7. A chopper control system according to claim 1, in which said chopper includes a first series circuit consisting of said auxiliary thyristor and a diode, and being connected across said main thyristor; and a second series circuit consisting of a reactor and a capacitor, and being connected across said auxiliary thyristor.

* * * * *